US011250206B2

(12) United States Patent
Jain et al.

(10) Patent No.: US 11,250,206 B2
(45) Date of Patent: Feb. 15, 2022

(54) CONVERSION OF FORMS TO ACTION CARDS

(71) Applicant: Microsoft Technology Licensing, LLC, Redmond, WA (US)

(72) Inventors: Atishay Jain, Meerut (IN); Pratik Kumar Jawanpuria, Redmond, WA (US); Rohit Srivastava, Hyderabad (IN); Purushottam Kulkarni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 16/577,608

(22) Filed: Sep. 20, 2019

(65) Prior Publication Data

US 2021/0089618 A1 Mar. 25, 2021

(51) Int. Cl.
*G06F 40/174* (2020.01)
*G06F 9/451* (2018.01)
*G06F 40/154* (2020.01)
*H04N 1/04* (2006.01)
*G06F 17/00* (2019.01)

(52) U.S. Cl.
CPC ............ *G06F 40/174* (2020.01); *G06F 9/453* (2018.02); *G06F 40/154* (2020.01); *H04N 1/04* (2013.01)

(58) Field of Classification Search
CPC ...... G06F 40/174; G06F 40/154; G06F 9/453; G06F 17/2264; G06F 17/248; G06F 17/2211; H04N 1/04
See application file for complete search history.

(56) References Cited

U.S. PATENT DOCUMENTS

| 7,607,078 B2 | 10/2009 | Geva et al. |
| 7,730,396 B2 | 6/2010 | Chidlovskii et al. |
| 8,910,039 B2 | 12/2014 | Leguin et al. |
| 2011/0271173 A1 | 11/2011 | Ait-mokhtar et al. |
| 2015/0052424 A1* | 2/2015 | Sikchi ................... G06F 40/226 715/239 |
| 2015/0081728 A1 | 3/2015 | Rosenberg et al. |

(Continued)

FOREIGN PATENT DOCUMENTS

| CN | 102103587 A | 6/2011 |
| EP | 1715411 A1 | 10/2006 |

OTHER PUBLICATIONS

"International Search Report and Written Opinion Issued in PCT Application No. PCT/US20/038550", dated Nov. 2, 2020, 12 Pages.

(Continued)

*Primary Examiner* — Quoc A Tran
(74) *Attorney, Agent, or Firm* — Schwegman Lundberg & Woessner, P.A.

(57) ABSTRACT

A system and method for converting a form to an action card format for a chat-based application is described. The system accesses an unfilled form and identifies one or more converters based on a format of the unfilled form. The system then identifies fields in the unfilled form using the one or more converters. A document model is generated based on the fields and a layout of the fields. The system determines the layout based on a visual alignment and logical relation of the fields. The system forms a digital interactive workflow based on the document model.

20 Claims, 12 Drawing Sheets

(56) References Cited

U.S. PATENT DOCUMENTS

| | | | |
|---|---|---|---|
| 2015/0154171 A1* | 6/2015 | Jensen | G06F 40/174 |
| | | | 715/224 |
| 2017/0017618 A1 | 1/2017 | Dunn et al. | |
| 2017/0147540 A1 | 5/2017 | Mccormick et al. | |
| 2017/0192950 A1* | 7/2017 | Gaither | G06F 9/453 |
| 2018/0004724 A1* | 1/2018 | Ramesan | H04L 51/34 |
| 2018/0089158 A1* | 3/2018 | Mehta | G06F 3/0482 |

OTHER PUBLICATIONS

"Create, Edit, and Collaborate on a Form in Microsoft Teams", Retrieved From: https://support.office.com/en-gb/article/create-edit-and-collaborate-on-a-form-in-microsoft-teams-333b97a3-41d9-48bc-a1cb-84a96bd44e14, Jul. 22, 2019, 8 Pages.

"Designing Forms for Auto Field Detection in Adobe Acrobat", In Adobe Acrobat 9 Technical White Paper, Apr. 13, 2012, 7 Pages.

"Easily Create Online Forms with Acrobat", Retrieved From: https://acrobatusers.com/tutorials/easily-create-electronic-forms, Apr. 8, 2009, 2 Pages.

Petrica, Cristina, "New Feature to Turn Paper Scans into Responsive Digital Forms", Retrieved From: https://www.123formbuilder.com/blog/new-feature-to-turn-paper-scans-into-responsive-digital-forms/, Jan. 10, 2019, 6 Pages.

\* cited by examiner

FIG. 11

CONVERSION OF FORMS TO ACTION CARDS

BACKGROUND

The subject matter disclosed herein generally relates to a special-purpose machine that convert data from one format to another, including computerized variants of such special-purpose machines and improvements to such variants. Specifically, the present disclosure addresses systems and methods for converting unfilled forms obtained via different types of inputs to a digital workflow chat application-based format.

Forms or questionnaires are commonly used in enterprises to collect data. Some of the questionnaires may be in physical form (e.g., paper) or digital form (e.g., a picture of a document, a PDF document). Organizations may use applications to generate digital workflows to collect form or questionnaire data. The conversion of a form in physical or digital format to digital workflow takes a significant amount of time. A user typically reads the form and manually creates entries and fields in a digital workflow based on the entries from the form (physical or digital).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 11 illustrates an example of a conversion of a form in a document to an action card in accordance with one example embodiment.

DETAILED DESCRIPTION

Figure 1:
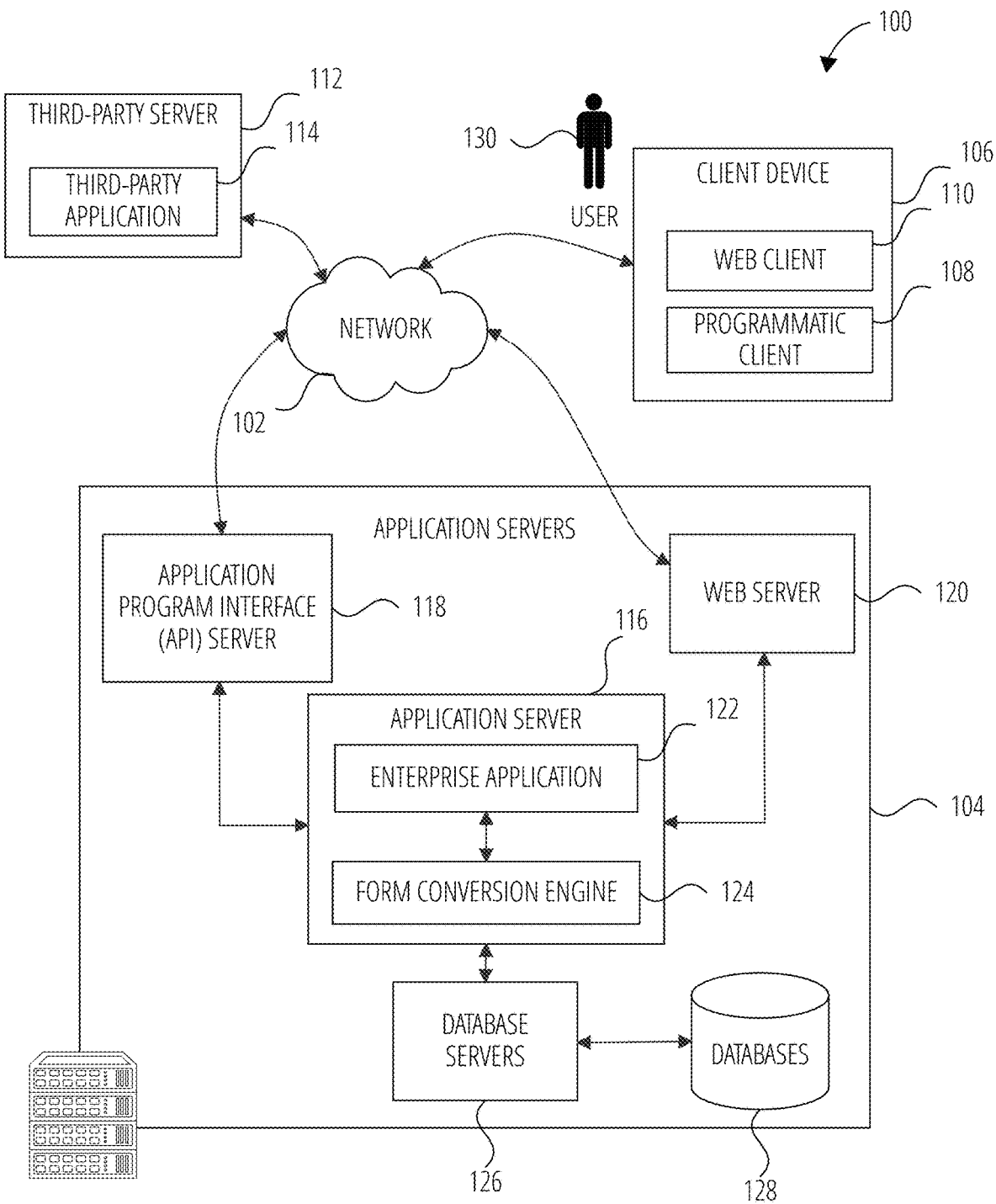
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

An enterprise represents an organization or groups of users associated with an organization. The users of the enterprise may make use of enterprise applications. Examples of enterprise applications include chat-based applications, email applications, document editing applications, document sharing applications, and other types of applications used by enterprises.

The present application describes a system and a method for converting an unfilled form acquired via different formats (e.g., images, pdf, text document) to a model form that can be used to generate a digital workflow such as an action card for an enterprise chat-based communication application (e.g., Microsoft Kaizala™). In other examples, the model form can be used to generate a form in other types of digital format (e.g., HTML). An "action card" includes a visual representation of a card that includes relevant information for display on a client device of a user via an enterprise application. The enterprise application generates a pop-up display of the action card within (or outside) the enterprise application. One example of an action card includes an activity card that identifies an activity assigned to the user, the type of activity (e.g., email, phone call, task), the time of the activity due, and an action function (e.g., mark the activity complete). Another example of an action card includes an "upcoming meeting" card that identifies a meeting scheduled for today, the meeting description, and an action function (e.g., open the appointment). In another example, the action card includes an interactive workflow to input data from a user in the form of a survey or form. The action function may trigger a function within the enterprise application or with another application operating on the client device. In other examples, the enterprise chat-based communication application enables a user to generate an action card to request a survey, submit bills, share a checklist, or schedule a meeting.

The present document describes an enterprise chat-based communication application that converts existing unfilled forms into action cards (or other types of outputs). The action cards can be generated from different types of input (e.g., such by taking a picture of printed form, providing a PDF document, a Microsoft Word™ document, or an online form). The present system reduces the effort in manually converting forms by creating new forms based on the detected fields in the existing unfilled forms. The conversion process is based on a combination of machine learning, image processing, and Optical Character Recognition (OCR) techniques to generate a document model used to form an action card (or any other types of digital output) with a workflow corresponding to the detected fields (e.g., enter name, enter address). In another example, the workflow detects conditional fields (e.g., if department is x, select from department x) and updates the document model accordingly. For example, an action card may be displayed based on a user response to a previous action card.

In one example embodiment, a system and method for converting a form to an action card format for a chat-based application is described. The system accesses an unfilled form and identifies one or more converters based on a format of the unfilled form. The system then identifies fields in the unfilled form using the one or more converters. A document model is generated based on the fields and a layout of the fields. The system determines the layout based on a visual alignment and logical relation of the fields. The system forms a digital interactive workflow based on the document model.

As a result, one or more of the methodologies described herein facilitate solving the technical problem of digitizing fields of forms to a digital workflow (e.g., action cards) for an enterprise application. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment in which some example embodiments of the present disclosure may be implemented or deployed. One or more application servers 104 provide server-side functionality via a network 102 to a networked user device, in the form of a client device 106. A user 130 operates the client device 106. The client device 106 includes a web client 110 (e.g., a browser), a programmatic client 108 (e.g., an enterprise application such as Microsoft Outlook™, an instant message application, a document writing application, or a shared document storage application) that is hosted and executed on the client device 106. In one example embodiment, the programmatic client 108 syncs data with the enterprise application 122.

An Application Program Interface (API) server 118 and a web server 120 provide respective programmatic and web interfaces to application servers 104. A specific application server 116 hosts the enterprise application 122 and a form conversion engine 124. Both enterprise application 122 and form conversion engine 124 include components, modules and/or applications.

The enterprise application 122 may include applications (e.g., a server side chat-based (also referred to as instant message) enterprise application, a server side email/calendar enterprise application, a document writing enterprise application, a shared document storage enterprise application) that enable users of an enterprise to communicate, collaborate and share document, messages, and other data (e.g., meeting information, common projects) with each other. For example, the user 130 at the client device 106 accesses the enterprise application 122 to send an instant message containing a form to other users of the enterprise. In another example, the user 130 at the client device 106 may access the enterprise application 122 to edit documents that are shared with other users of the same enterprise. In yet another example, the client device 106 accesses the enterprise application 122 to retrieve or send messages or emails to and from other peer users of the enterprise. Other examples of enterprise application 122 includes enterprise systems, content management systems, and knowledge management systems.

In one example embodiment, the form conversion engine 124 communicates with the enterprise application 122. For example, the form conversion engine 124 receives an input of an image of a form (also referred to as a questionnaire) from the enterprise application 122, converts the questionnaire to a digital format, and provides the model document in digital format to the enterprise application 122. In another example embodiment, the form conversion engine 124 communicates with the programmatic client 108 and receives a pdf of a questionnaire from the user 130. In one example, the web client 110 communicates with the form conversion engine 124 and enterprise application 122 via the programmatic interface provided by the Application Program Interface (API) server 118.

The form conversion engine 124 accesses an existing unfilled form (received from the enterprise application 122 or the client device 106) and converts it into an action card for use by the enterprise application 122. In one example embodiment, the form conversion engine 124 receives different types of inputs (e.g., such by taking a picture of printed form, providing a PDF document, a Microsoft Word™ document, or an online form) for the unfilled form. The unfilled form is, for example, a form that has not yet been filled out by any user. The form conversion engine 124 identifies a converter (e.g., form converter) based on the type of input (e.g., image, pdf, text) and applies the converter to digitize the unfilled form. In one example embodiment, the form conversion engine 124 uses a conversion process that is based on a combination of machine learning, image processing, and Optical Character Recognition (OCR) techniques to generate a document model. The document model can be used to generate a workflow in the form of action cards. The form conversion engine 124 provides the action cards to the client device 106 via the enterprise application 122. In another example embodiment, the enterprise application 122 receives a request from the client device 106 to deploy the action cards to other client devices.

The application server 116 is shown to be communicatively coupled to database servers 126 that facilitates access to an information storage repository or databases 128. In an example embodiment, the databases 128 includes storage devices that store information to be processed by the enterprise application 122 and the form conversion engine 124.

Additionally, a third-party application 114 may, for example, store another part of the enterprise application 122, or include a cloud storage system. For example, the third-party application 114 stores other conversion engines (e.g., OCR, PDF editors). The third-party application 114 executing on a third-party server 112, is shown as having programmatic access to the application server 116 via the programmatic interface provided by the Application Program Interface (API) server 118. For example, the third-party application 114, using information retrieved from the application server 116, may support one or more features or functions on a website hosted by the third party.

Figure 2:
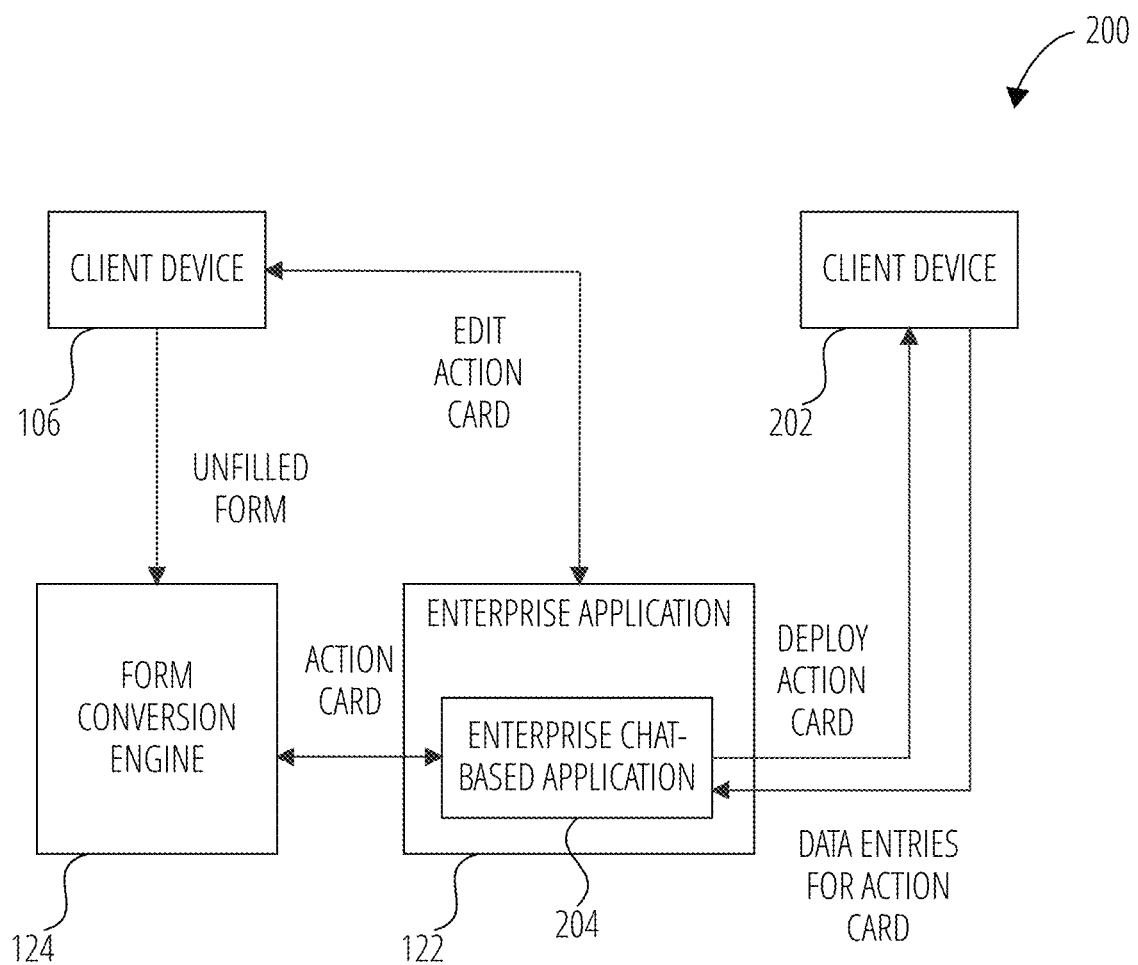
FIG. 2 is a block diagram illustrating an example operation of the networked environment in accordance with one embodiment.

FIG. 2 is a block diagram illustrating an example of a network operation 200 in accordance with one embodiment. The client device 106 submits an image of an unfilled form (or a text of the unfilled form, a pdf of the unfilled form) to the form conversion engine 124. The form conversion engine 124 converts the image of the unfilled form to a machine-readable document that includes organized fields detected from the unfilled form. The machine-readable document may also be referred to as a document model. In one example embodiment, the form conversion engine 124 generates an action card based on the organized fields of the document model. The form conversion engine 124 provides the action card to an enterprise chat-based application 204 (included in the enterprise application 122). The enterprise chat-based application 204 communicates the action card to the client device 106. The client device 106 edits or modifies the action card and provides the revised action card back to the enterprise chat-based application 204. The client device

106 can also send a request to the enterprise chat-based application 204. The request includes, for example, a request to deploy the action card to other members of the enterprise. The enterprise chat-based application 204 deploys the action card by communicating the action card to the client device 202, via a client enterprise chat-based application operating on the client device 202. The client device 202 provides entries corresponding to fields in the action card back to the enterprise chat-based application 204. The data entries are stored in a database of the enterprise application 122.

Figure 3:
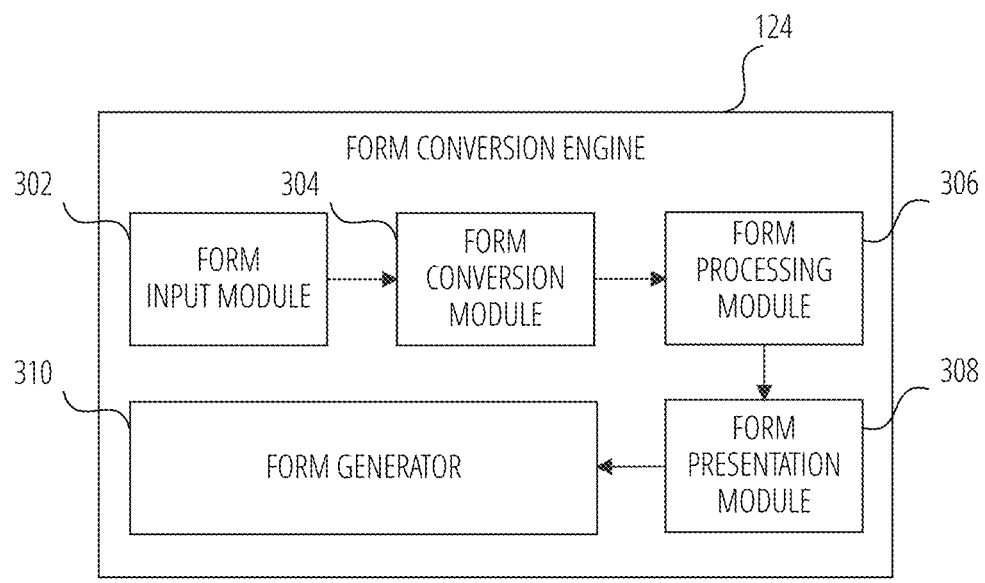
FIG. 3 is a block diagram illustrating a form action card engine in accordance with one example embodiment.

FIG. 3 is a block diagram illustrating the form conversion engine 124 in accordance with one example embodiment. The form conversion engine 124 comprises a form input module 302, a form conversion module 304, a form processing module 306, a form presentation module 308, and a form generator 310. The form input module 302 is configured to receive unfilled forms from different types of format as an input. For example, the unfilled form may be in PDF format, Microsoft Word™ format, an image format, a text format, or a combination thereof.

The form conversion module 304 comprises converters that convert the input in different formats into a common document model. There can be more than one converter for a given input type. For example, different pdf editors (also referred to as pdf parsers) may be used for a pdf document. Each converter acts independently on the input form and outputs the document model. For example, an image processor may be applied to an image of the form and generates a first output. A classification model may also be independently applied to the same image of the form and generates a second output. The second output is merged with the first output to create a document model.

Therefore, each converter is configured to merge the output with the previous document model identified in a pipeline. Examples of converters for image files include deep learning technique for region detection and field identification, and other services for table detection. Example of converters for PDF files include PDF converters (parsers). It is noted that layered processing design allows more converters to be added into the chain to allow further improvements.

Once the input form is converted into a document model, the form processing module 306 identifies different components of the form such as headers, key fields, and type of key fields. The form processing module 306 also extract keys from table structure. In one example embodiment, the form processing module 306 operates using pattern detection algorithms and trained Machine Learning (ML) models to identify the form entities. The form processing module 306 can also use a language model that can identify commonly occurring fields in the forms by processing the textual content in the forms. For example, the form processing module 306 includes a learning engine that manages the ML models for commonly occurring fields in the forms by processing the textual content in the forms. In one example, the learning engine analyzes the fields to identify trends (e.g., commonly used fields such as "name" and "address"). Based on the ML models, the learning engine can, in one embodiment, suggest a field corresponding to a textual content.

The form presentation module 308 identifies grouping of the fields into sections based on physical placement and logical relation of the fields in the unfilled form. The form presentation module 308 also breaks lengthy forms into different pages such that it can be laid out in devices with smaller form factor.

The form generator 310 converts the document model into a desired output format. For example, the form generator 310 converts the document model to an action card or into other formats such as JSON, HTML, XML. In one example embodiment, the form generator converts the document model into a digital interactive workflow process that uses action cards or other types of graphical user interfaces to request and receive data in corresponding form fields from users. In another example embodiment, the action card includes a collection of HTML, JavaScript and JSON data files. If any change is needed in the action card, a user can view and tweak the action card package.

Figure 4:
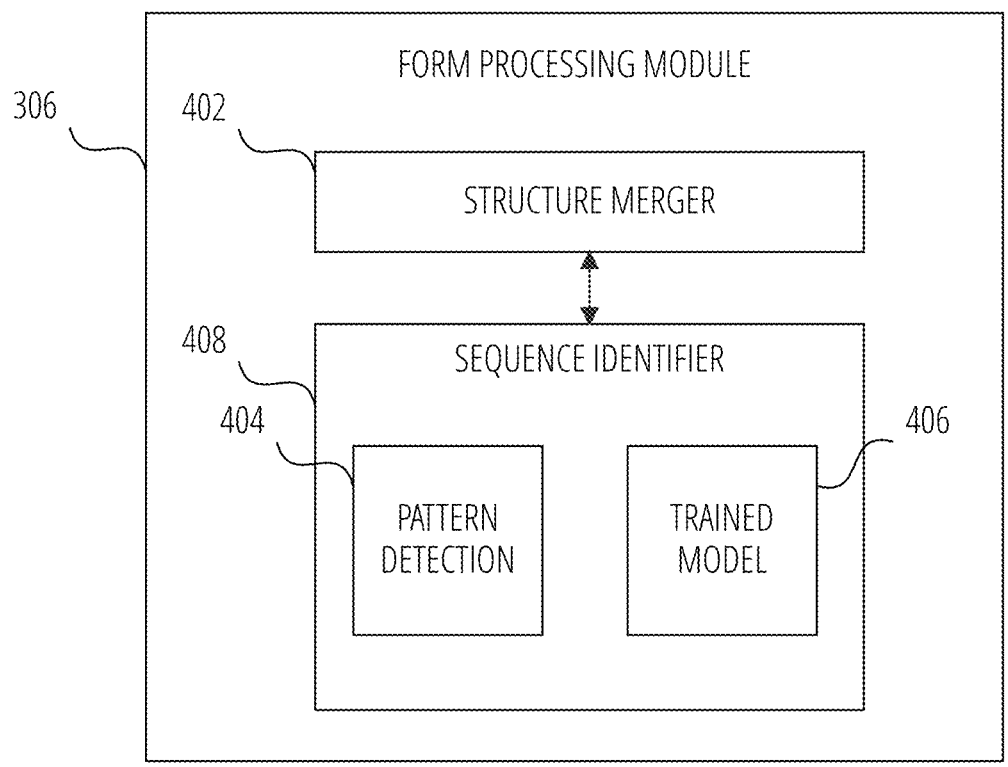
FIG. 4 is a block diagram illustrating a form processing module in accordance with one embodiment.

FIG. 4 is a block diagram illustrating the form processing module 306 in accordance with one example embodiment. The form processing module 306 comprises a structure merger 402, a pattern detection 404, a trained model 406, and a sequence identifier 408. The structure merger 402 merges the document models from each converter. For example, an image processor is applied to an image of the form and generates a first document model. A classification model may also be independently applied to the same image of the form and generates a second document model. The structure merger 402 merges the second document model with the first document model.

The sequence identifier 408 identifies fields and structures in the form. For example, the pattern detection 404 operates with the trained model 406 to detect different components of the form such as headers, key fields, type of key fields and extract keys from table structure. The trained model 406 uses machine learning techniques to detect the different structures (or components) in the form.

Figure 5:
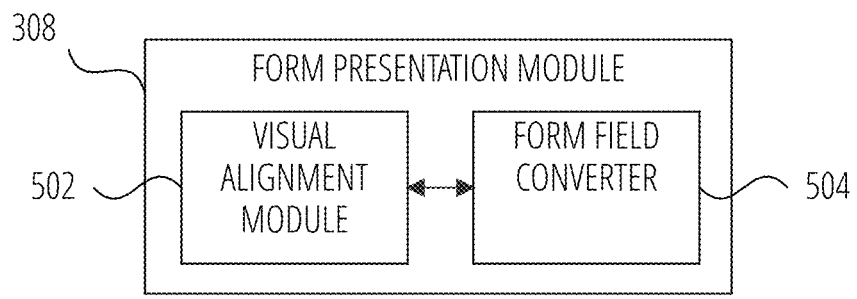
FIG. 5 is a block diagram illustrating a form presentation module in accordance with one embodiment.

FIG. 5 is a block diagram illustrating a form presentation module 308 in accordance with one example embodiment. The form presentation module 308 comprises a visual alignment module 502, and a form field converter 504. The visual alignment module 502 identifies grouping of the fields into sections based on their physical placement and logical relation of the fields. It breaks lengthy forms into different pages for better display in devices with smaller form factors. The form field converter 504 maps identified fields into visual element to display to the user.

Figure 6:
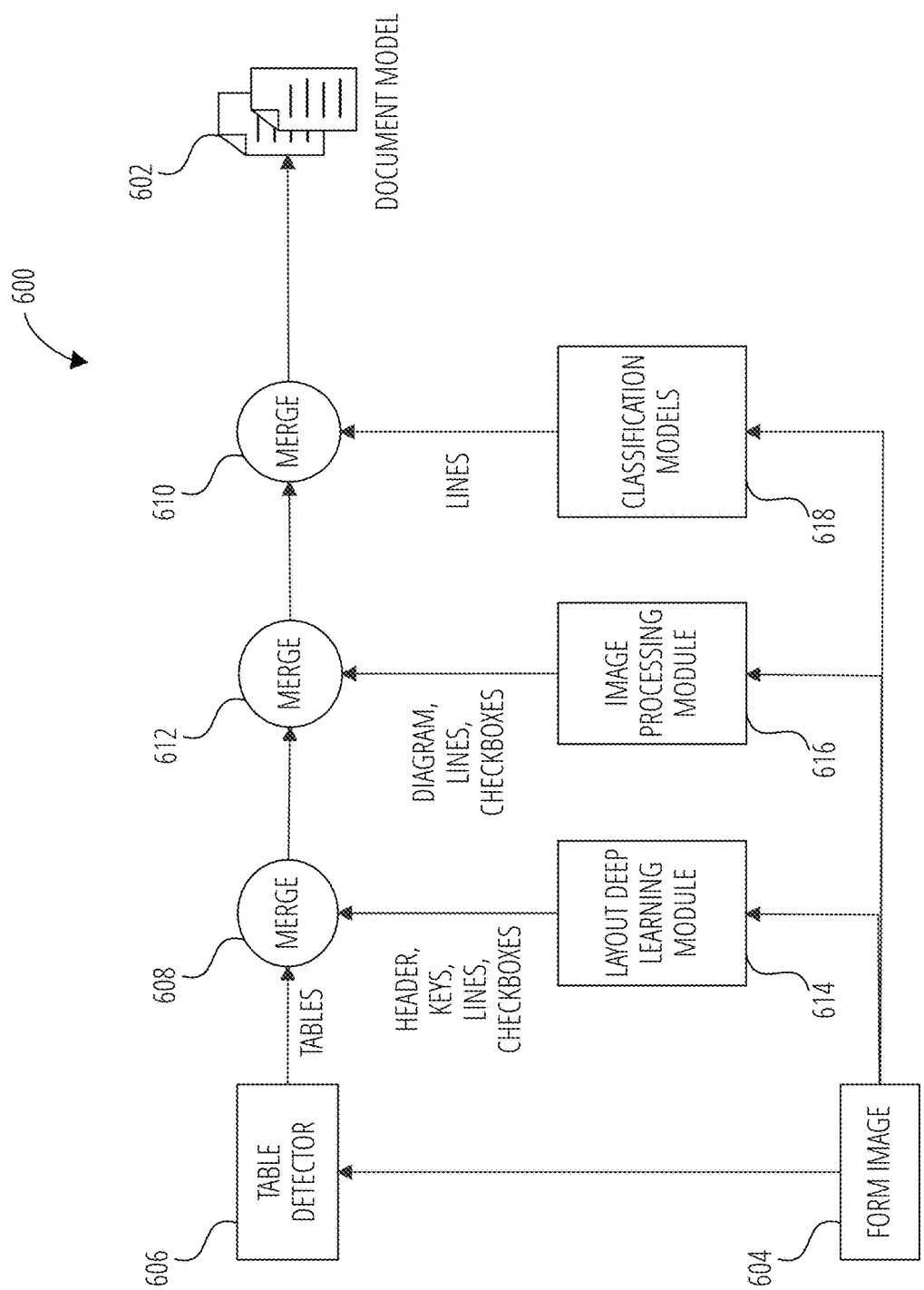
FIG. 6 is a sequence diagram illustrating an example of generating a document model in accordance with one embodiment.

FIG. 6 illustrates an example generating a document model using the form processing module 306 on a form image 604 in accordance with one embodiment. The form processing module 306 uses a combination of techniques to identify content (e.g., fields) in the forms. For example, a form image 604 is fed into a table detector 606 to detect tables. A Layout Deep Learning module 614 applies P2P layout analysis to the form image 604 to detect headers, key fields, lines, and checkboxes. An image processing module 616 applies computer vision recognition technique to the form image 604 to identify diagrams, lines, and checkboxes. A classification models 618 applies a trained model to detect lines in the form image 604. The results of the various techniques are merged with the results of other techniques at merge 608, merge 612, merge 610 to generate a document model 602.

Figure 7:
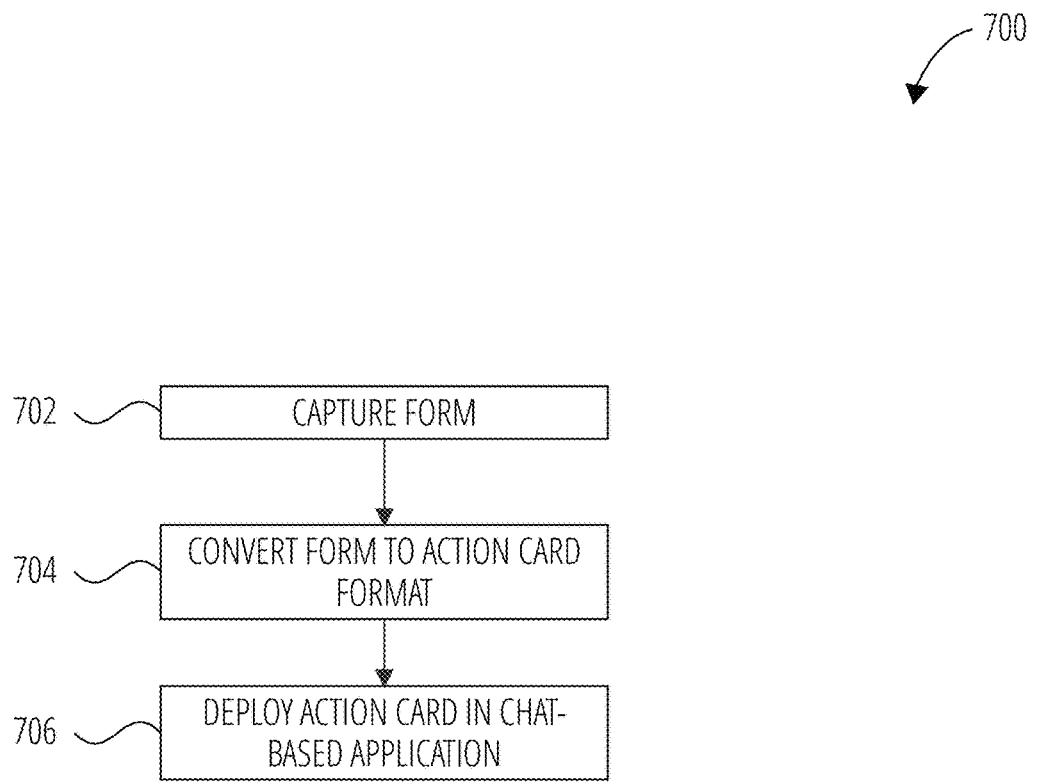
FIG. 7 is a flow diagram illustrating a method for deploying an action card in accordance with one example embodiment.

FIG. 7 is a flow diagram illustrating a method for deploying an action card in accordance with one example embodiment. Operations in the method 700 may be performed by the form conversion engine 124, using components (e.g., modules, engines) described above with respect to FIG. 3. Accordingly, the method 700 is described by way of example with reference to the form conversion engine 124. However, it shall be appreciated that at least some of the operations of the method 700 may be deployed on various other hardware configurations or be performed by similar components residing elsewhere. For example, some of the operations may be performed at the client device 106 or at third-party application 114.

At block 702, the form input module 302 captures a form from one or more source (e.g., a picture of the form, a pdf of the form, a text document of the form). At block 704, the form generator 310 converts the form to an action card format. At block 706, the form generator 310 deploys the action card in the enterprise chat-based application 204.

Figure 8:
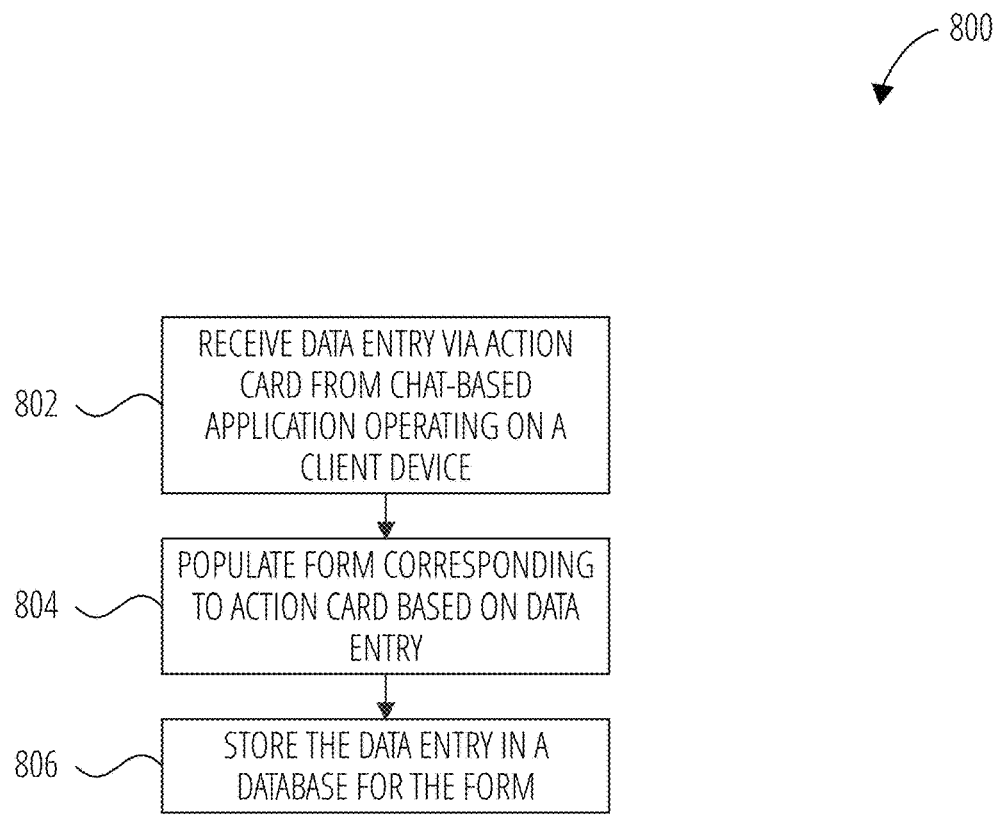
FIG. 8 is a flow diagram illustrating a method for processing forms with action cards in accordance with one example embodiment.

FIG. 8 is a flow diagram illustrating a method for processing forms with action cards in accordance with one example embodiment. Operations in the method 800 may be performed by the form conversion engine 124, using components (e.g., modules, engines) described above with respect to FIG. 2. Accordingly, the method 800 is described by way of example with reference to the form conversion engine 124. However, it shall be appreciated that at least some of the operations of the method 800 may be deployed on various other hardware configurations or be performed by similar components residing elsewhere. For example, some of the operations may be performed at the client device 106.

At block 802, the enterprise chat-based application 204 receives data entry from the client device 202 via an action card from a chat-based application operating on the client device 202. At block 804, the network 1220 or the enterprise chat-based application 204 populates the form corresponding to the action card based on the data entry received at the enterprise chat-based application 204.

Figure 9:
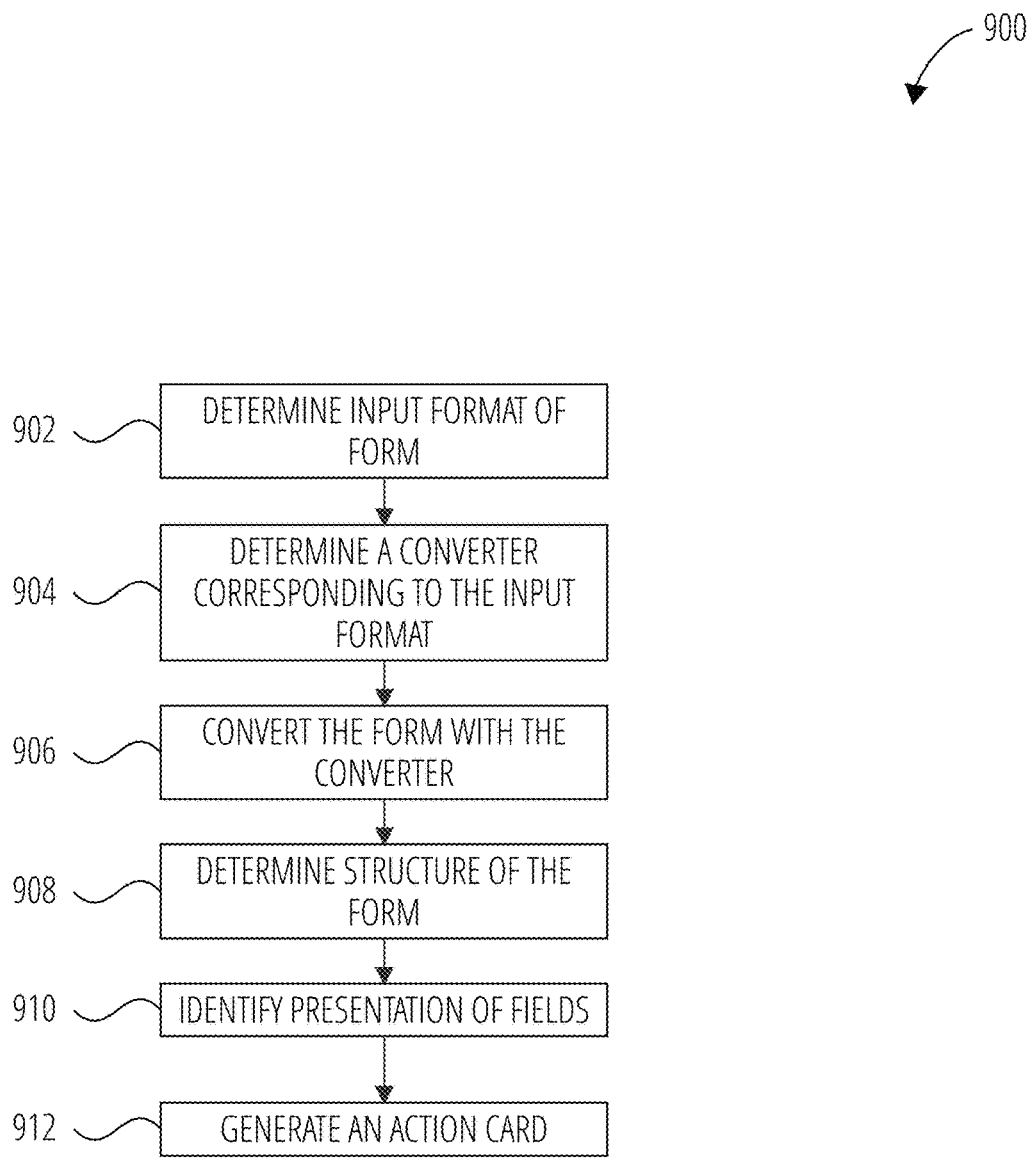
FIG. 9 is a flow diagram illustrating a method for generating an action card in accordance with one example embodiment.

FIG. 9 is a flow diagram illustrating a method 900 for computing collaboration strength metrics in accordance with one example embodiment. Operations in the method 900 may be performed by the form conversion engine 124, using components (e.g., modules, engines) described above with respect to FIG. 3. Accordingly, the method 900 is described by way of example with reference to the form conversion engine 124. However, it shall be appreciated that at least some of the operations of the method 900 may be deployed on various other hardware configurations or be performed by similar components residing elsewhere. For example, some of the operations may be performed at the client device 106.

At block 902, the form input module 302 determines input format of the form. At block 904, the form conversion module 304 determines one or more converters corresponding to the input format of the form. At block 906, the form conversion module 304 converts the form with the corresponding converters and merges the output (from the different converters) to generate a document model. At block 908, the form processing module 306 determines a structure of the form. At block 910, the form presentation module 308 identifies a visual presentation of the fields in the form. At block 912, the form generator 310 generates an action card based on the converted form, structure of the form, and detected fields in the form.

Figure 10:
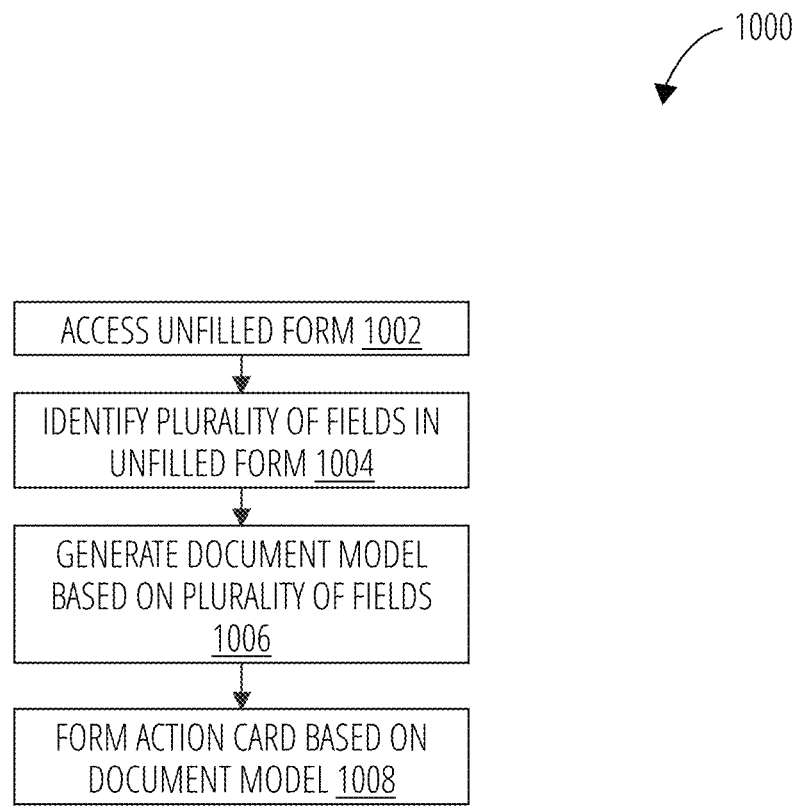
FIG. 10 is a flow diagram illustrating a routine in accordance with one example embodiment.

FIG. 10 illustrates a routine in accordance with one embodiment. In block 1002, routine 1000 accesses an unfilled form. In block 1004, routine 1000 identifies a plurality of fields in the unfilled form. In block 1006, routine 1000 generates a document model based on the plurality of fields. In block 1008, routine 1000 forms an action card based on the document model.

Figure 11:
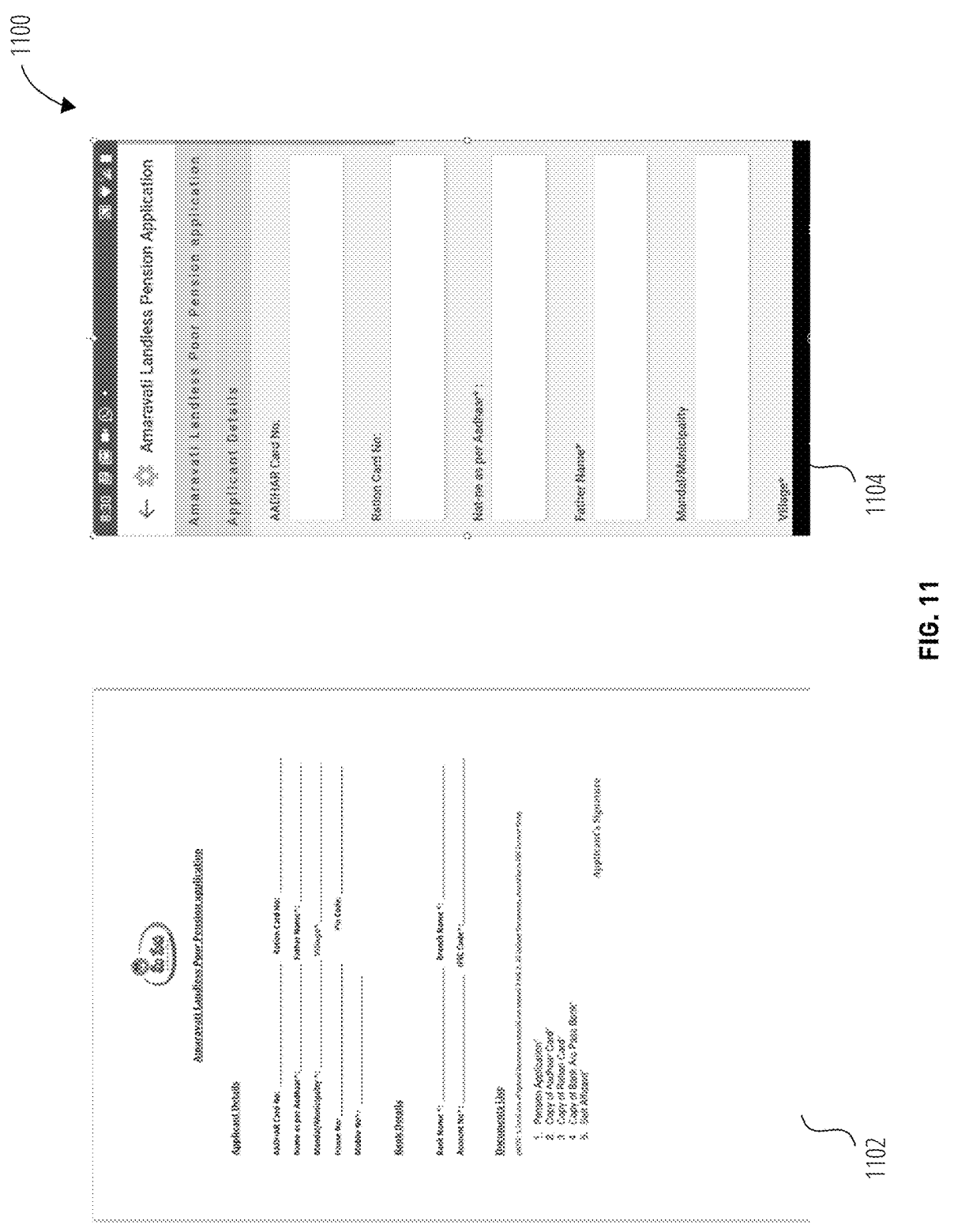

FIG. 11 illustrates an example of a conversion 1100 of a picture or pdf of an unfilled form 1102 to an action card 1104 in accordance with one embodiment.

Figure 12:
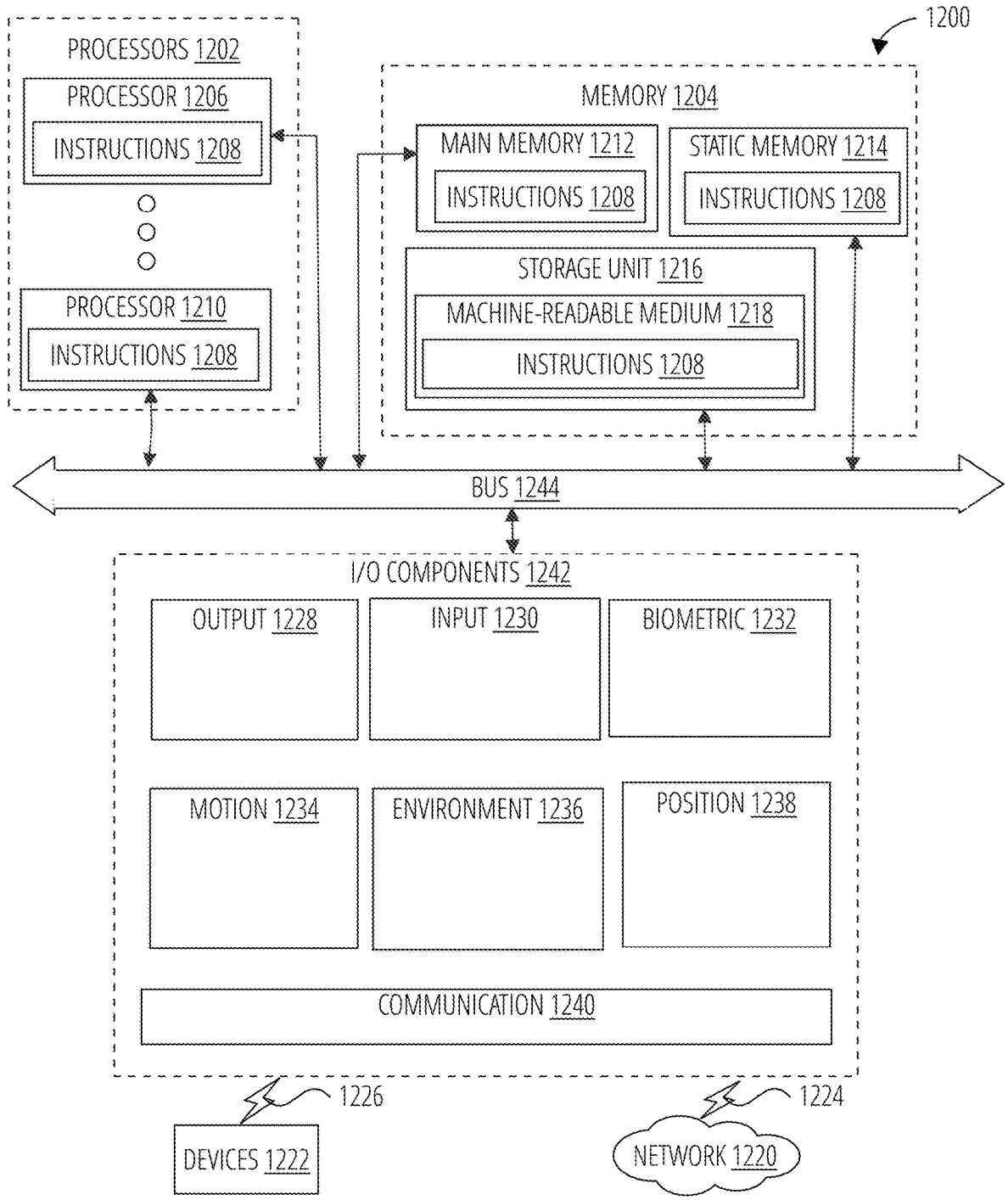
FIG. 12 is a diagrammatic representation of a machine in the form of a computer system within which a set of instructions may be executed for causing the machine to perform any one or more of the methodologies discussed herein, according to an example embodiment.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include processors 1202, memory 1204, and I/O components 1242, which may be configured to communicate with each other via a bus 1244. In an example embodiment, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the processor's cache memory), or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones may include a touch input device or other such input mechanisms, while a headless server machine will likely not include such a touch input device. It will be appreciated that the I/O components 1242 may include many other components that are not shown in FIG. 12. In various example embodiments, the I/O components 1242 may include output components 1228 and input components 1230. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1242 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1242 further include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the processors 1202) and/or storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed embodiments.

The instructions 1208 may be transmitted or received over the network 1220, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: accessing an unfilled form; identifying one or more converters based on a format of the unfilled form; identifying a plurality of fields in the unfilled form using the one or more converters; generating a document model based on the plurality of fields; and forming an action card based on the document model.

Example 2 is the computer-implemented method of example 1, further comprising: converting the unfilled form from a first format to the document model based on the identified plurality of fields; identifying a second format corresponding to the action card; converting the document from the first format to the second format based on the plurality of fields; and generating an interactive workflow for the action card based on the plurality of fields.

Example 3 is the computer-implemented method of example 1, further comprising: receiving, from a first client device, a request to communicate the action card to a second client device; and communicating the action card to the second client device.

Example 4 is the computer-implemented method of example 3, wherein receiving further comprises receiving the request from the first client device via a first chat-based application operating on the first client device, wherein communicating further comprises providing the action card via a second chat-based application operating on the second client device.

Example 5 is the computer-implemented method of example 4, further comprising: receiving a data entry for a corresponding field in the action card from the second client device via the second chat-based application; and storing the data entry in a database.

Example 6 is the computer-implemented method of example 1, further comprising: receiving the unfilled form via a first chat-based application operating on a first client device; providing the action card to the first client device; receiving revision information indicating a modification of the action card from the first client device; and modifying the action card based on the revision information.

Example 7 is the computer-implemented method of example 1, wherein the action card is configured to be operated with a chat-based application, the chat-based application configured to generate a mapping for each field of the action card.

Example 8 is the computer-implemented method of example 1, further comprising: converting the unfilled form from a first format to the document model based on the identified plurality of fields; identifying a second format, the second format being based on at least one of an HTML format, a JSON format, an XML format; and converting the document model to a new document based on the second format.

Example 9 is the computer-implemented method of example 1, wherein the unfilled form is in a first format that includes at least one of an image, a pdf document, or a text document.

Example 10 is the computer-implemented method of example 9, further comprising: identifying the first format; identifying a first converter corresponding to the first format; identifying a second converter corresponding to the first format; generating a first document model with the first converter configured to operate on the unfilled form; generating a second document model with the second converter configured to operate on the unfilled form; forming a single document model by merging the first document model with the second document model; identifying a structure of the single document model; identifying a pattern of the single document model; organizing fields based on the structure and pattern in the single document model; and forming a layout of the single document model based on the organized fields.

What is claimed is:
1. A computer-implemented method comprising:
accessing an unfilled form;
identifying at least one converter based on a format of the unfilled form;
identifying a plurality of fields in the unfilled form using the at least one converter;
generating a document model based on the plurality of fields;
identifying a structure and a pattern of the document model;
organizing the plurality of fields based on the structure and the pattern of the document model;
forming a layout of the document model based on the organized fields; and
forming an action card based on the layout of the document model.
2. The computer-implemented method of claim 1, further comprising:
converting the unfilled form from a first format to the document model based on the identified plurality of fields;
identifying a second format corresponding to the action card; and
converting the document from the first format to the second format based on the plurality of fields; and
generating an interactive workflow for the action card based on the plurality of fields.
3. The computer-implemented method of claim 1, further comprising:
receiving, from a first client device, a request to communicate the action card to a second client device; and
communicating the action card to the second client device.
4. The computer-implemented method of claim 3, wherein receiving further comprises receiving the request from the first client device via a first chat-based application operating on the first client device,
wherein communicating further comprises providing the action card via a second chat-based application operating on the second client device.
5. The computer-implemented method of claim 4, further comprising:

receiving a data entry for a corresponding field in the action card from the second client device via the second chat-based application; and storing the data entry in a database.

6. The computer-implemented method of claim 1, further comprising:

receiving the unfilled form via a first chat-based application operating on a first client device;

providing the action card to the first client device;

receiving revision information indicating a modification of the action card from the first client device; and modifying the action card based on the revision information.

7. The computer-implemented method of claim 1, wherein the action card is configured to be operated with a chat-based application, the chat-based application configured to generate a mapping for each field of the action card.

8. The computer-implemented method of claim 1, further comprising:

converting the unfilled form from a first format to the document model based on the identified plurality of fields;

identifying a second format, the second format being based on at least one of an HTML, format, a JSON format, and an XML format; and converting the document model to a new document based on the second format.

9. The computer-implemented method of claim 1, wherein the unfilled form is in a first format that includes at least one of an image, a pdf document, a rich-text document, or a text document.

10. The computer-implemented method of claim 9, further comprising:

identifying the first format;

identifying a first converter corresponding to the first format;

identifying a second converter corresponding to the first format;

generating a first document model with the first converter configured to operate on the unfilled form;

generating a second document model with the second converter configured to operate on the unfilled form; and forming a single document model by merging the first document model with the second document model.

11. A computing apparatus comprising:

a processor; and a memory storing instructions that, when executed by the processor, configure the apparatus to perform operations rising:

access an unfilled form;

identify at least one converter based on a format of the unfilled form;

identify a plurality of fields in the unfilled form using the at least one converter;

generate a document model based on the plurality of fields;

identify a structure and a pattern of the document model;

organize the plurality of fields based on the structure and the pattern of the document model;

form a layout of the document model based on the organized fields; and form an action card based on the layout of the document model.

12. The computing apparatus of claim 11, wherein the instructions further configure the apparatus to:

convert the unfilled form from a first format to the document model based on the identified plurality of fields;

identify a second format corresponding to the action card;

convert the document from the first format to the second format based on the plurality of fields; and generate an interactive workflow for the action card based on the plurality of fields.

13. The computing apparatus of claim 11, wherein the instructions further configure the apparatus to:

receive, from a first client device, a request to communicate the action card to a second client device; and communicate the action card to the second client device.

14. The computing apparatus of claim 13, wherein receive further comprises receiving the request from the first client device via a first chat-based application operating on the first client device, wherein communicating further comprises provide the action card via a second chat-based application operating on the second client device.

15. The computing apparatus of claim 14, wherein the instructions further configure the apparatus to:

receive a data entry for a corresponding field in the action card from the second client device via the second chat-based application; and store the data entry in a database.

16. The computing apparatus of claim 11, wherein the instructions further configure the apparatus to:

receive the unfilled form via a first chat-based application operating on a first client device;

provide the action card to the first client device;

receive revision information indicating a modification of the action card from the first client device; and modify the action card based on the revision information.

17. The computing apparatus of claim 11, wherein the action card is configured to be operated with a chat-based application, the chat-based application configured to generate a mapping for each field of the action card.

18. The computing apparatus of claim 11, wherein the instructions further configure the apparatus to:

convert the unfilled form from a first format to the document model based on the identified plurality of fields;

identify a second format, the second format being based on at least one of an HTML, format, a JSON format, and an XML format; and convert the document model to a new document based on the second format.

19. The computing apparatus of claim 11, wherein the unfilled form is in a first format that includes at least one of an image, a pdf document, a rich-text document, or a text document, wherein the instructions further configure the apparatus to:

identify the first format;

identify a first converter corresponding to the first format;

identify a second converter corresponding to the first format;

generate a first document model with the first converter configured to operate on the unfilled form;

generate a second document model with the second converter configured to operate on the unfilled form; and form a single document model by merging the first document model with the second document model.

20. A non-transitory computer-readable storage medium, the computer-readable storage medium including instructions that when executed by a computer, cause the computer to:
- access an unfilled form;
- identify at least one converter based on a format of the unfilled form;
- identify a plurality of fields in the unfilled form using the at least one converter;
- generate a document model based on the plurality of fields;
- identify a structure and a pattern of the document model;
- organize the plurality of fields based on the structure and the pattern of the document model;
- form a layout of the document model based on the organized fields; and
- form an action card based on the layout of the document model.

* * * * *